(12) United States Patent
Kovacic et al.

(10) Patent No.: US 11,300,291 B2
(45) Date of Patent: Apr. 12, 2022

(54) BURNER HOUSING

(71) Applicant: Berry Metal Company, Harmony, PA (US)

(72) Inventors: Thomas Kovacic, Harmony, PA (US); Michael Mattich, Harmony, PA (US); Gary Bugar, Harmony, PA (US)

( * ) Notice: Subject to any disclaimer, the term of this patent is extended or adjusted under 35 U.S.C. 154(b) by 7 days.

(21) Appl. No.: 15/803,223

(22) Filed: Nov. 3, 2017

(65) Prior Publication Data

US 2018/0313537 A1    Nov. 1, 2018

Related U.S. Application Data

(60) Provisional application No. 62/416,851, filed on Nov. 3, 2016.

(51) Int. Cl.
*F23D 14/78* (2006.01)
*F27D 9/00* (2006.01)

(52) U.S. Cl.
CPC ...... *F23D 14/78* (2013.01); *F27D 2009/0013* (2013.01)

(58) Field of Classification Search
CPC .......................... F23D 14/78; F27D 2009/0013
USPC ......... 266/241, 265, 267; 373/66, 72, 76, 85
See application file for complete search history.

(56) References Cited

U.S. PATENT DOCUMENTS

| 3,638,929 | A | 2/1972 | Brulhet |
| 4,392,637 | A | 7/1983 | Weber et al. |
| 4,497,475 | A | 2/1985 | Fuchs et al. |
| 6,614,831 | B2* | 9/2003 | Shver .................. C21C 5/5217 373/66 |
| 7,951,325 | B2* | 5/2011 | Higgins ............... C21C 5/5217 266/216 |
| 8,142,711 | B2* | 3/2012 | Glass .................. C21C 5/5217 266/241 |
| 9,068,742 | B2* | 6/2015 | Kim ........................ F23G 7/065 |
| 2002/0001332 | A1 | 1/2002 | Shver |
| 2007/0058689 | A1 | 3/2007 | Rymarchyk et al. |
| 2014/0265067 | A1* | 9/2014 | Eyfa ....................... F27D 9/00 266/46 |

FOREIGN PATENT DOCUMENTS

| EP | 1170385 | 1/2002 |
| GB | 2280501 | 2/1995 |

* cited by examiner

*Primary Examiner* — Scott R Kastler
*Assistant Examiner* — Michael Aboagye
(74) *Attorney, Agent, or Firm* — Clark Hill PLC

(57) ABSTRACT

A burner housing, comprising: an internal cartridge housed in an external housing; wherein the internal cartridge defines a plurality of ports selected from the group consisting of: an inlet cooling fluid port, an outlet cooling fluid port; a burner port; particle injection port; a cooling fluid circuit defined by and/or disposed in the internal cartridge and/or the external housing; and wherein the internal cartridge is made of a first material and the external housing is made from a second material.

9 Claims, 9 Drawing Sheets

BURNER HOUSING

This application claims the benefit of provisional patent application U.S. Ser. No. 62/416,851 filed Nov. 3, 2016, which is incorporated by reference herein for all purposes.

FIELD OF THE DISCLOSURE

The present disclosure generally relates to an improved housing for apparatus such as auxiliary burners used in metal melting, refining and processing, for example, steel making in an electric arc furnace (EAF) or blast furnace.

BACKGROUND OF THE DISCLOSURE

Generally auxiliary burners are used to assist in the steel making process to add thermal energy by the combustion of fuel, the injection of oxidizing gas for melt refining, foamy slag production or post combustion of carbon monoxide, and the injection of particulates for slag and foamy slag production. In many instances, the oxidizing gas is introduced as a high velocity stream that may exceed sonic velocities.

Existing housings for protecting such auxiliary burners and other apparatus have various deficiencies that detract from the efficiency and economy of the steelmaking process.

In order to overcome the disadvantages associated with typical burner housings, it would be desirable to provide a burner housing having a similar geometry to existing burner housings cans that is capable of housing a burner and/or a particle injector; that provides greater cooling efficiency while using less copper metal.

It would also be desirable to provide a burner housing of a hybrid design having an internal cartridge made of a first material such as steel and external housing made of a second material such as copper.

BRIEF SUMMARY OF THE DISCLOSURE

Many other variations are possible with the present disclosure, and those and other teachings, variations, and advantages of the present disclosure will become apparent from the description and figures of the disclosure.

One aspect of a preferred embodiment of the present disclosure comprises a burner housing, comprising an internal cartridge housed in an external housing; wherein the internal cartridge defines a plurality of ports selected from the group consisting of: an inlet cooling fluid port, an outlet cooling fluid port; a burner port; particle injection port; a cooling fluid circuit defined by and/or disposed in the internal cartridge and/or the external housing; and wherein the internal cartridge is made of a first material and the external housing is made from a second material.

In another aspect of a burner housing of the present disclosure, the internal cartridge is made of steel and the external housing is made from copper.

Another aspect of a preferred embodiment of the present disclosure comprises a fluid cooled burner housing, comprising an inlet cooling fluid port; an outlet cooling fluid port; wherein the inlet and outlet cooling fluid ports are in fluid communication to an external cooling fluid source; and a cooling fluid circuit comprising a plurality of cooling panels; wherein each cooling panel houses an individual cooling fluid circuit and has a cooling fluid inlet and outlet in fluid communication with a manifold; wherein the manifold is in fluid communication with the inlet and outlet cooling fluid ports of the burner housing.

In another aspect of a fluid cooled burner housing of the present disclosure, each individual cooling fluid circuit of each panel comprises one or more pipes.

In yet another aspect of a fluid cooled burner housing of the present disclosure, each individual cooling fluid circuit of each panel comprises one or more conduits defined within each cooling panel. Preferably, such conduits may be made by drilling or by casting.

In another aspect of a fluid cooled burner housing of the present disclosure, each individual cooling panel comprises a copper housing.

In a further aspect of a fluid cooled burner housing of the present disclosure, each individual cooling fluid circuit of each panel comprises one or more pipes. Preferably, such pipes comprise steel.

In another aspect of a fluid cooled burner housing of the present disclosure, each of the inlet cooling fluid port, the outlet cooling fluid port and the manifold comprises steel.

BRIEF DESCRIPTION OF THE SEVERAL VIEWS OF THE DRAWINGS

For the present disclosure to be easily understood and readily practiced, the present disclosure will now be described for purposes of illustration and not limitation in connection with the following figures, wherein.

DETAILED DESCRIPTION

In the following detailed description, reference is made to the accompanying examples and figures that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single disclosure or inventive concept if more than one is in fact disclosed.

The following description is, therefore, not to be taken in a limited sense, and the scope of this disclosure is defined by the appended claims.

Figure 1:
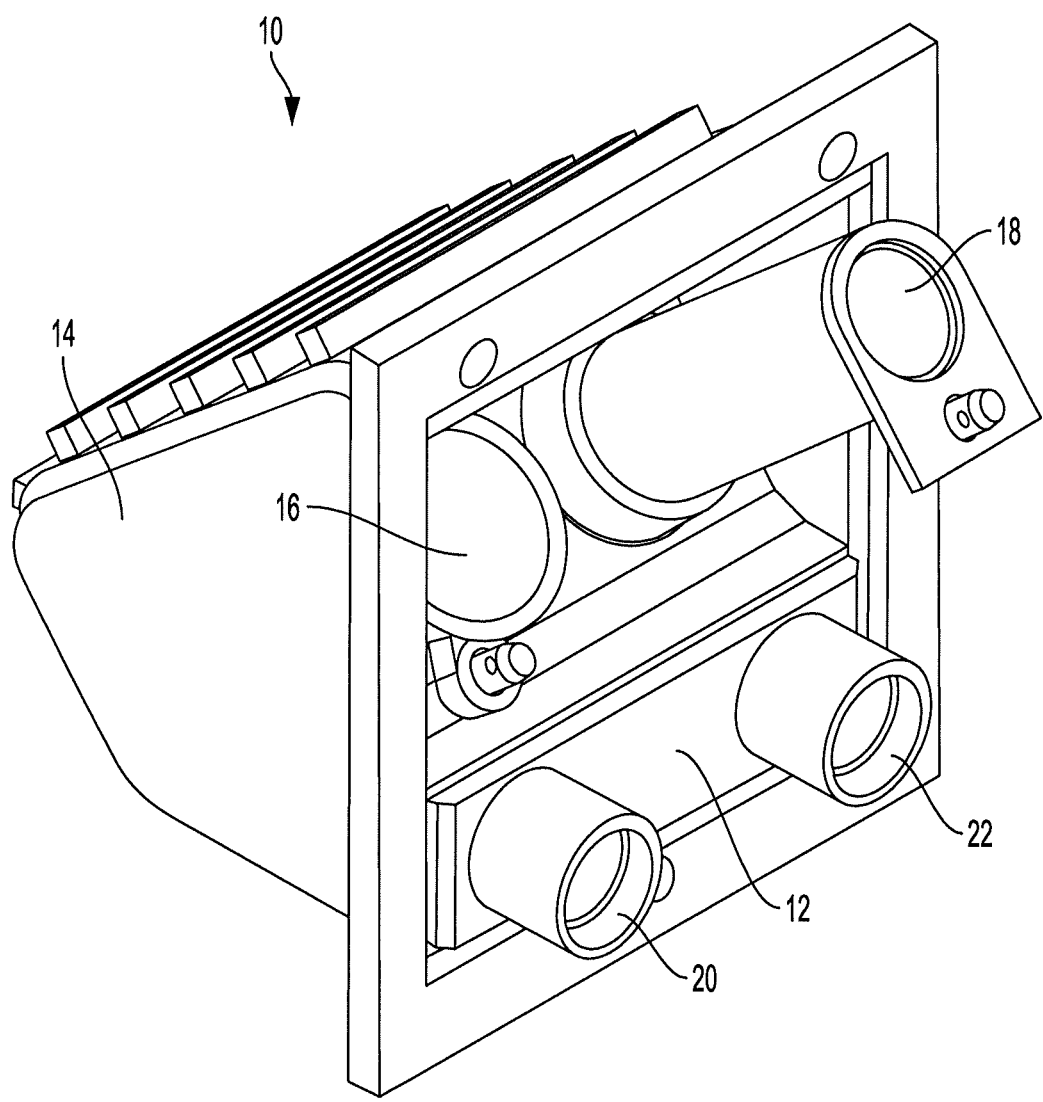
FIG. 1 shows a perspective view of a preferred "flame guard" style hybrid steel and copper burner housing according to the present disclosure.
Figure 3:
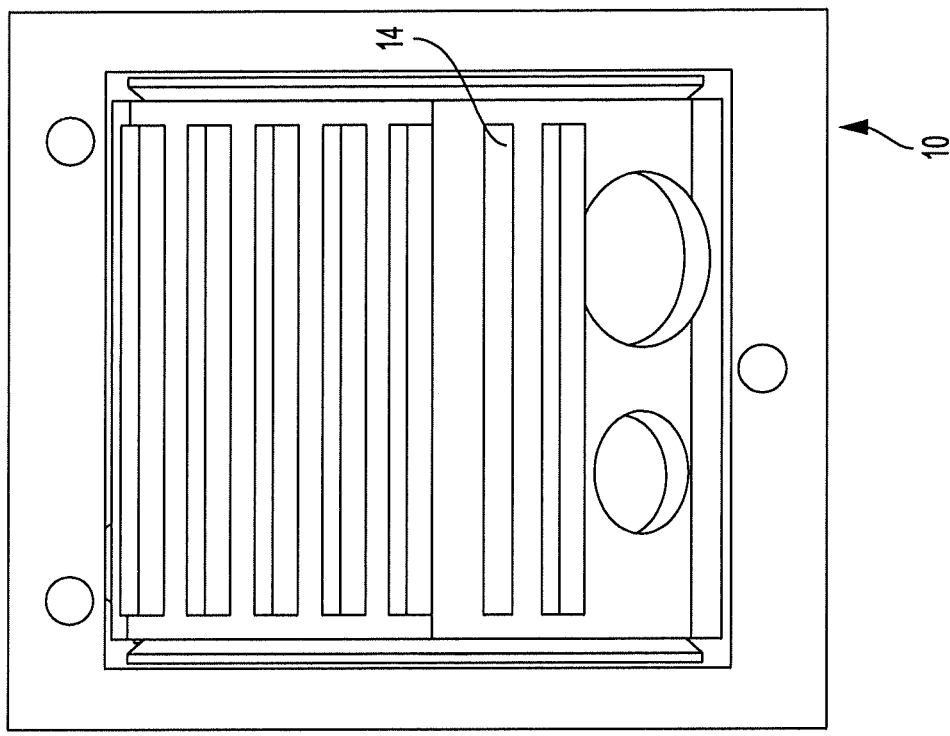
FIG. 3 shows a front elevational view of the preferred "flame guard" style hybrid steel and copper burner housing of FIG. 1.
Figure 2:
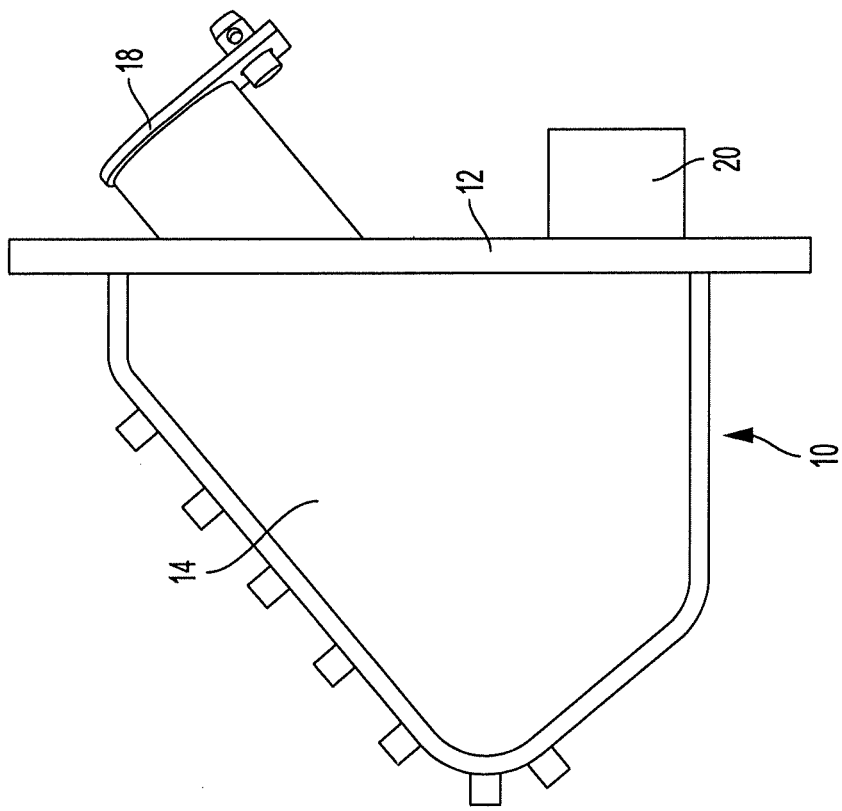
FIG. 2 shows a side elevational view of the preferred "flame guard" style hybrid steel and copper burner housing of FIG. 1.

FIGS. 1-3 show a preferred "flame guard" style hybrid burner housing 10 of the present disclosure, such as for a burner for an EAF (Electric Arc Furnace), blast furnace or other type of metallurgical furnace, comprising an internal cartridge 12 housed in an external housing 14; wherein the internal cartridge 12 defines a plurality of ports selected from the group consisting of: an inlet cooling fluid port 20, an outlet cooling fluid port 22; a burner port 16; media/particle injection port 18; and a cooling fluid circuit defined by and/or disposed in the internal cartridge 12 and/or the external housing 14; and wherein the internal cartridge 12 is made of a first material and the external housing 14 is made from a second material.

In another aspect of a preferred burner housing 10 of the present disclosure, the internal cartridge 12 is made of steel and the external housing 14 is made from copper. Preferably, external housing 14 is cast out of copper or fabricated out of copper and the remainder of the housing 10 is fabricated from steel and other materials as required. Housing 10 is more cost effective to manufacture than prior "flame guard" style burner housings.

Figure 5:
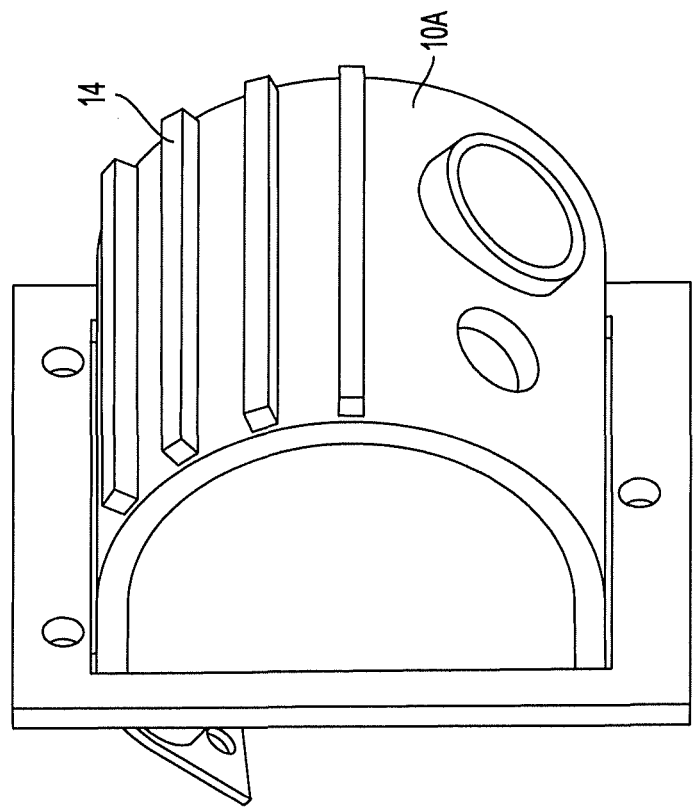
FIG. 5 shows a side elevational view of the preferred "keg" style hybrid steel and copper burner housing of FIG. 4.
Figure 4:
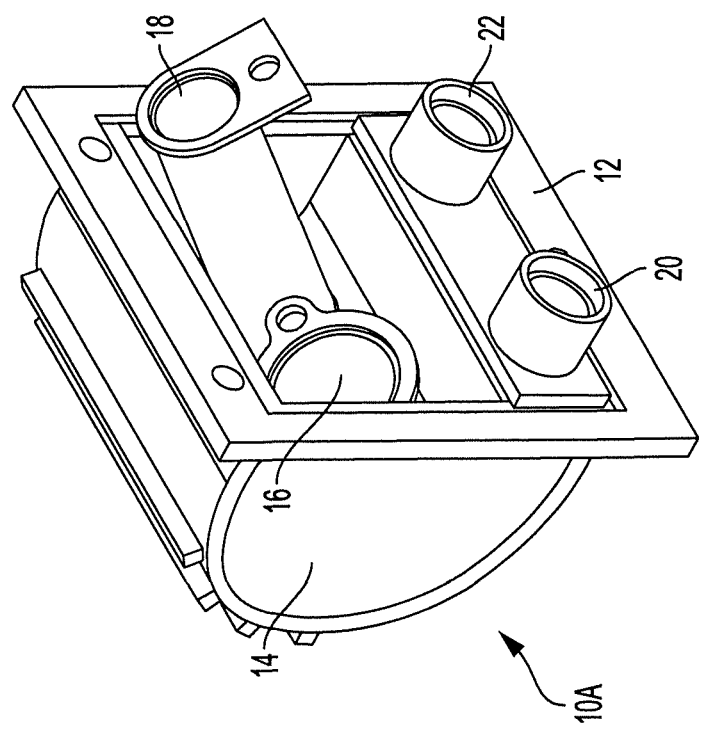
FIG. 4 shows a perspective view of a preferred "keg" style hybrid steel and copper burner housing according to the present disclosure.

FIGS. 4-5 show a preferred "keg style" burner housing 10A of the present disclosure, such as for a burner for an EAF (Electric Arc Furnace), blast furnace or other type of metallurgical furnace, of the present disclosure, comprises: an internal cartridge 12 housed in an external housing 14; wherein the internal cartridge 12 defines a plurality of ports selected from the group consisting of: an inlet cooling fluid port 20, an outlet cooling fluid port 22; a burner port 16; media/particle injection port 18; and a cooling fluid circuit disposed between in the internal cartridge 12 and the external housing 14; and wherein the internal cartridge 12 is made of a first material, such as steel, and the external housing 14 is made from a second material, such as copper. Preferably, external housing 14 is cast out of copper or fabricated out of copper and the remainder of the housing 10A is fabricated from steel and other materials as required. Housing 10A is more cost effective to manufacture and operates about 50 degrees F. cooler than prior burner housings.

Figure 6:
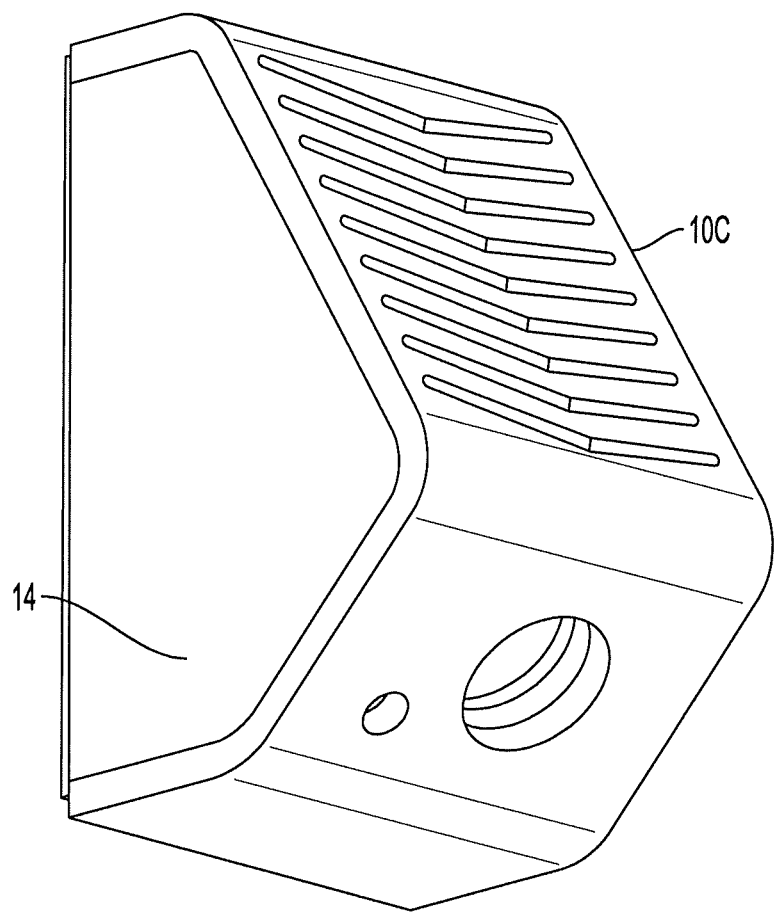
FIG. 6 shows a perspective view of a preferred "jet box" style hybrid steel and copper burner housing according to the present disclosure.
Figure 7:
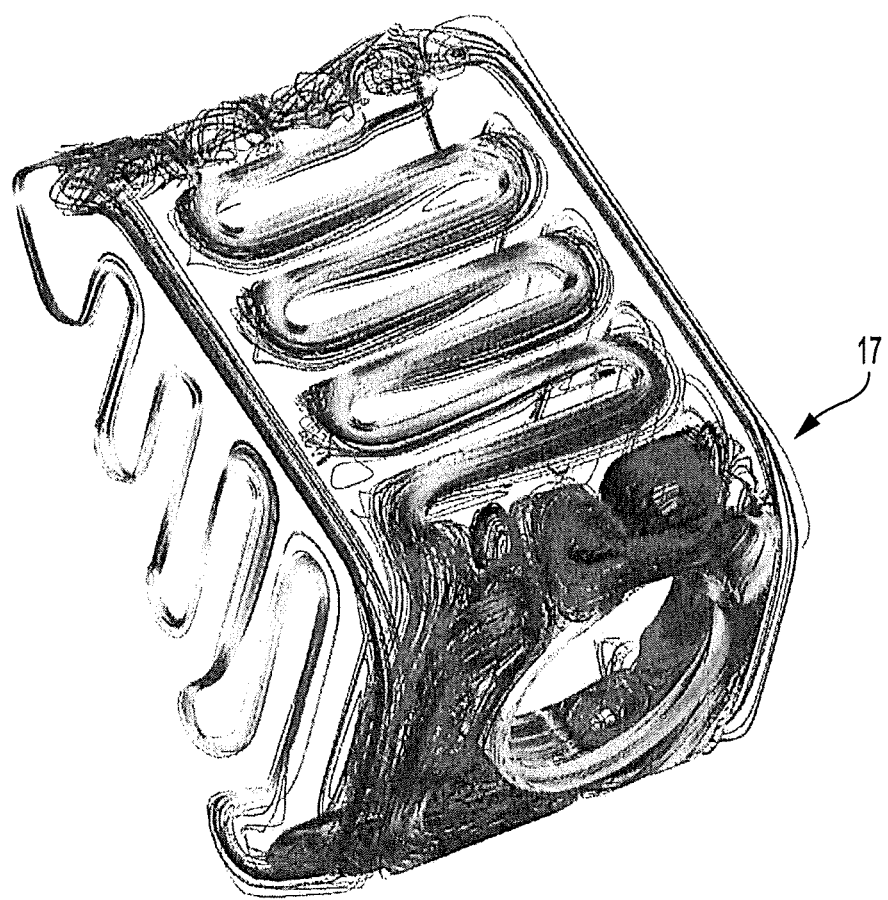
FIG. 7 shows a schematic view of a preferred cooling fluid circuit produced in the "jet box" style hybrid steel and copper burner housing of FIG. 6.
Figure 8:
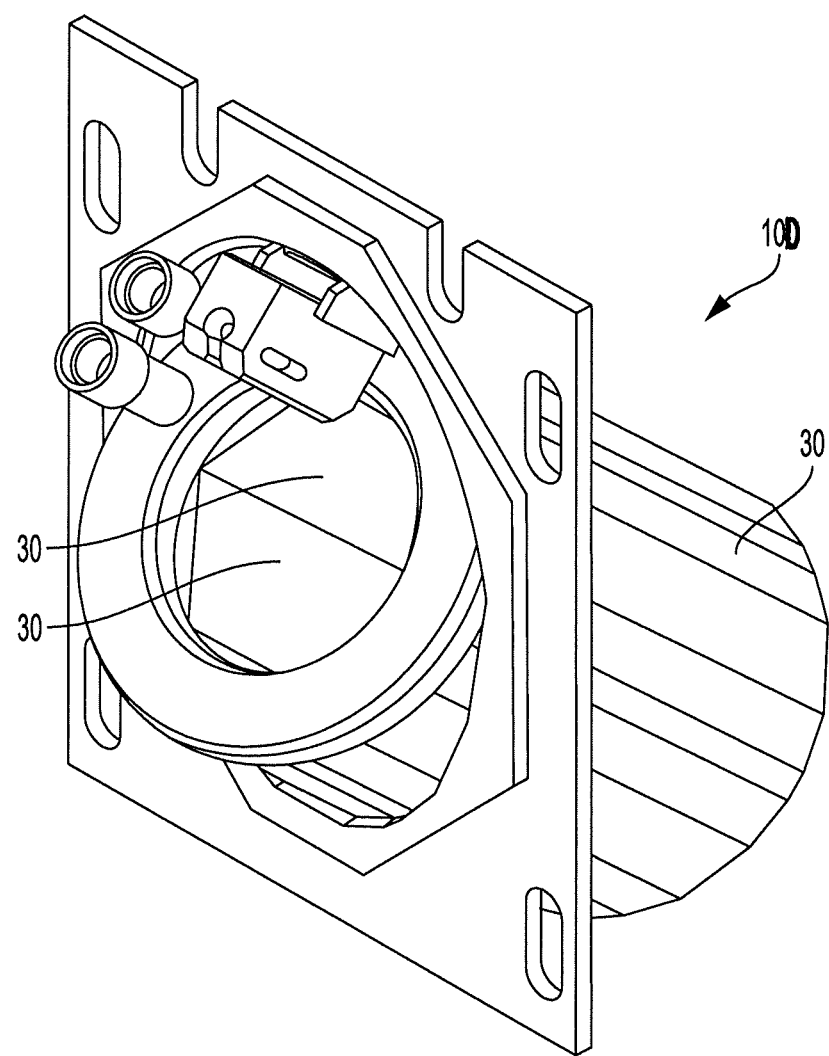
FIG. 8 shows a perspective view of a preferred "concast" style hybrid steel and copper burner housing according to the present disclosure.
Figure 9:
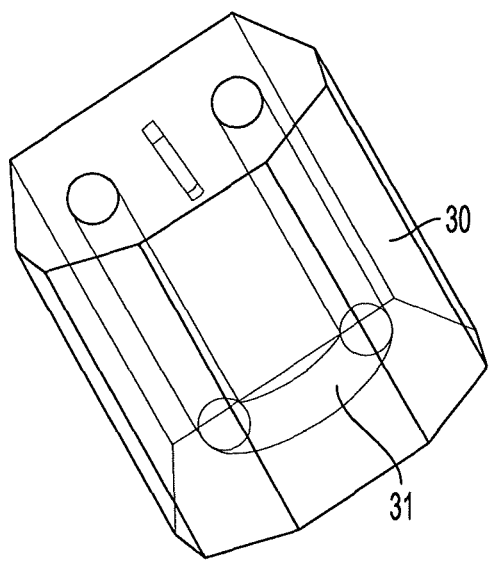
FIG. 9 shows a perspective "see through" view of a preferred modular cooling wall segment used in manufacturing the "concast" style hybrid steel and copper burner housing of FIG. 8.
Figure 10:
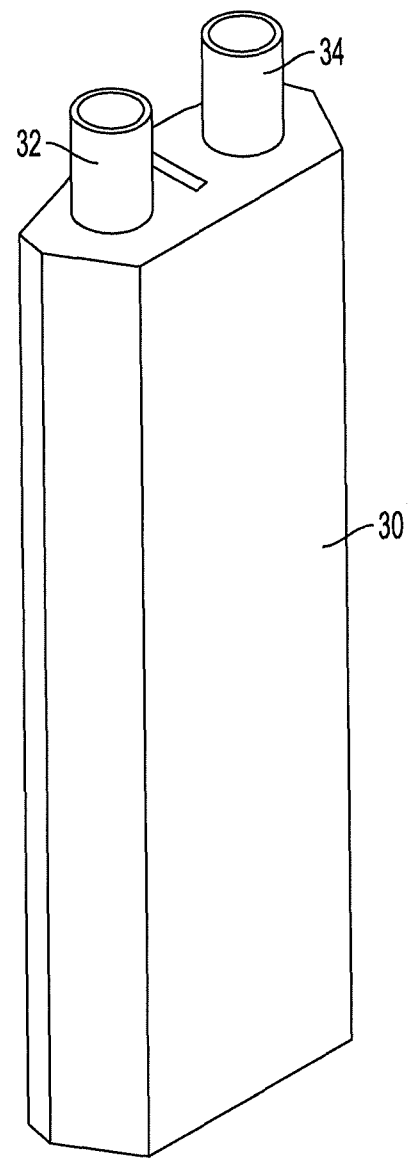
FIG. 10 shows a perspective view of a preferred modular cooling wall segment used in manufacturing the "concast" style hybrid steel and copper burner housing of FIG. 8.
Figure 11:
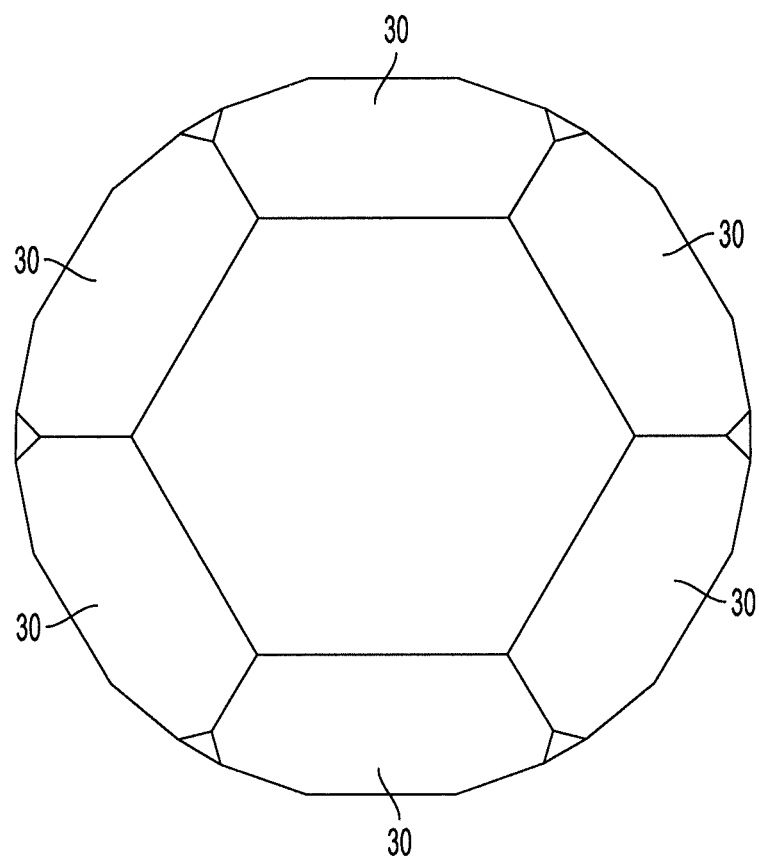
FIG. 11 shows a schematic view of preferred modular cooling wall segments forming an enclosed cooling wall for use the "concast" style hybrid steel and copper burner housing of FIG. 8.
Figure 13:
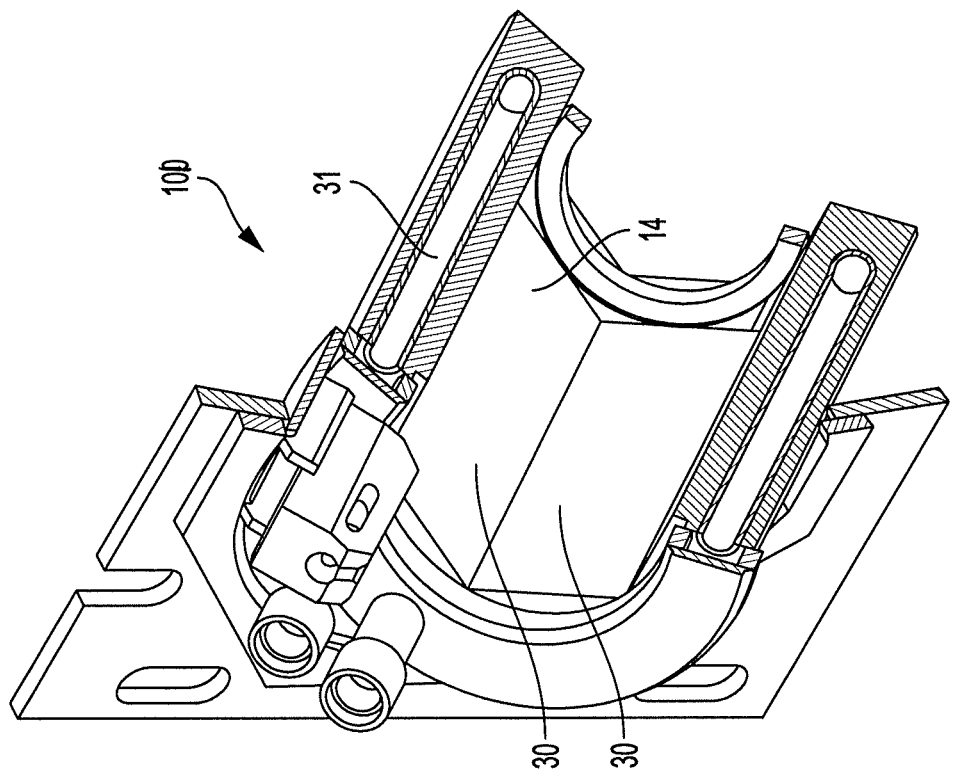
FIG. 13 shows a partial cut-away view of preferred modular cooling wall segments as used in the "concast" style hybrid steel and copper burner housing of FIG. 8.
Figure 12:
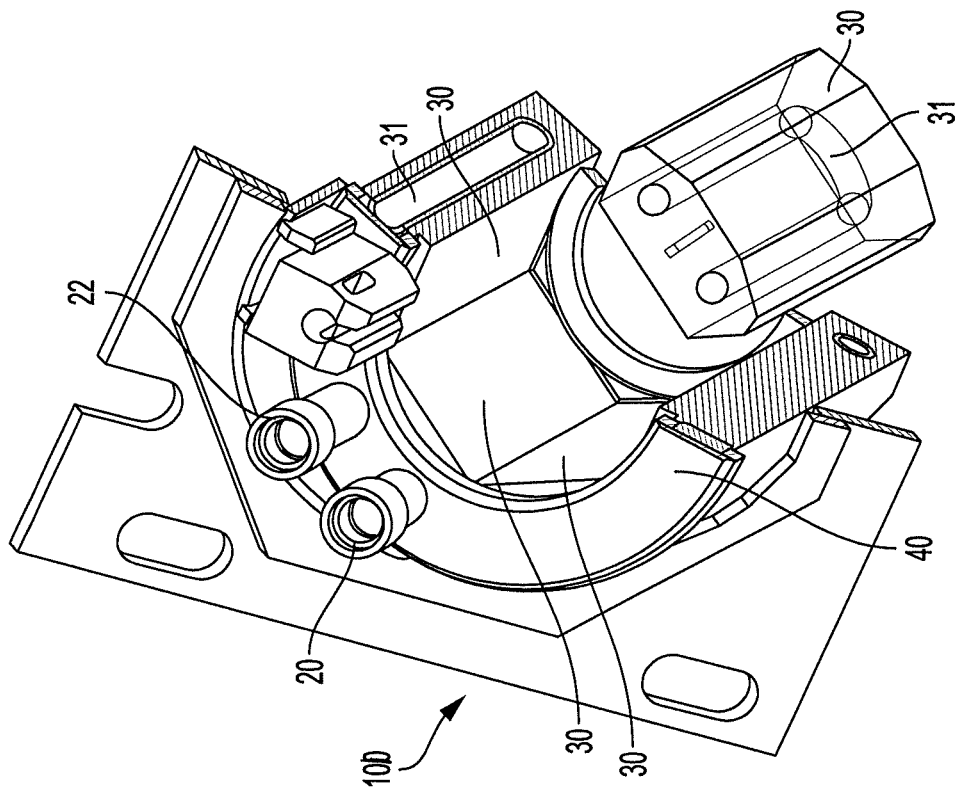
FIG. 12 shows a partial cut-away and partial "see-through" view of preferred modular cooling wall segments as used in the "concast" style hybrid steel and copper burner housing of FIG. 8.

FIGS. 6-7 show a preferred "jet box" burner housing 10C of the present disclosure, such as for a burner for an EAF (Electric Arc Furnace), blast furnace or other type of metallurgical furnace, of the present disclosure, comprises an external housing 14 for housing a combustion can such as is shown and described in U.S. Provisional Patent Application Ser. No. 62/416,807 filed Nov. 3, 2016, incorporated by reference herein for all purposes. Alternatively, housing 10C may house an internal cartridge (not shown, but as described above with respect to FIGS. 1-5) defines a plurality of ports selected from the group consisting of: an inlet cooling fluid port, an outlet cooling fluid port; a burner port; media/particle injection port. Burner housing 10C preferably defines a cooling fluid circuit 17 as shown in FIG. 7 disposed between external housing 14 and the contained combustion can or cartridge as the case may be. Preferably, external housing is made from copper while the combustion can has its own hybrid construction of copper and steel. Alternatively, the combustion can may be made primarily of copper. Also, a steel cartridge may be used instead of a combustion can.

Preferably, external housing 14 of housing 10C is cast out of copper or fabricated out of copper and the remainder of the housing 10C is fabricated from copper and/or steel and other materials as required. Housing 10C is more cost effective to manufacture, uses less copper and operates cooler than prior burner housings of similar design.

FIGS. 8-13 show a preferred "concast style" burner housing 10D of the present disclosure, the cooling fluid circuit comprises a plurality of modular cooling panels 30 preferably cast out of copper; wherein each modular cooling panel 30 houses its own cooling fluid circuit 31 (which may be internal pipes cast or cooling channels defined by the panel) and has a cooling fluid inlet 32 and outlet 34 in fluid communication with a baffle or manifold 40; wherein the baffle or manifold 40 is in fluid communication with the inlet and outlet cooling fluid ports 20, 22 of the burner housing 10. Housing 10D is more cost effective to manufacture and requires fewer welds than prior burner housings of similar design. Further, a large part of the manufacturing of housing 10D can be done offsite and easily assembled onsite.

In another aspect of a preferred burner housing 10D of the present disclosure, the structure of housing 10D other than modular cooling panels 30 and including inlet cooling fluid port 20, outlet cooling fluid port 22 and manifold 40 are preferably made from steel.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

What is claimed is:

1. A burner housing, comprising:
   an internal cartridge having an exterior surrace and being housed in an external housing having an interior and an interior surface that is substantially planar and complementary to the exterior surface of the internal cartridge;
   wherein the internal cartridge defines a plurality of ports selected from the group consisting of: an inlet cooling fluid port, an outlet cooling fluid port, a burner port, and a particle injection port;
   a tubeless cooling fluid circuit defined by the exterior surface of the internal cartridge and the interior surface of the external housing;
   wherein the internal cartridge is made of a first material and the external housing is made from a second material;

wherein each of the plurality of ports comprises a respective length and wherein the respective length of at least one of the plurality of ports extends into the interior of the external housing; and wherein at least one of the plurality of ports is configured to house a particle injector within the length of the at least one of the plurality of ports and wherein the at least one of the plurality of ports that is configured to house the particle injector has a continuous perimeter.

2. The burner housing of claim 1 wherein the internal cartridge is made of steel and the external housing is made from copper.

3. A hybrid burner housing for use in a metallurgical furnace comprising:
   an external housing formed of a first material and having an interior and an interior surface;
   an internal cartridge having an exterior surface that is complementary to the interior surface of the external housing, the internal cartridge being formed of a second material and housed by the external housing, wherein the internal cartridge defines a plurality of ports and at least one of the plurality of ports is a particle injector port;
   a tubeless cooling fluid circuit defined by and disposed between the external housing and the internal cartridge; and
   wherein each of the plurality of ports comprises a respective length and a respective continuous perimeter.

4. The hybrid burner housing of claim 3, wherein the plurality of ports other than the particle injector port are selected from the group consisting of: an inlet cooling fluid port, an outlet cooling fluid port, and a burner port.

5. The hybrid burner housing of claim 3, wherein the first material is copper, wherein the second material is steel, wherein the external housing is cast or fabricated out of copper, and wherein the internal cartridge is cast or fabricated out of steel.

6. The hybrid burner housing of claim 5, wherein both the external housing and the internal cartridge are fabricated.

7. The hybrid burner housing of claim 6, wherein the cooling fluid circuit defines a serpentine path.

8. The hybrid burner housing of claim 6, wherein the cooling fluid circuit is in fluid communication with an external cooling fluid source.

9. The hybrid burner housing of claim 6, wherein the internal cartridge defines four ports.

* * * * *